United States Patent
Gleich et al.

(10) Patent No.: US 6,364,518 B1
(45) Date of Patent: *Apr. 2, 2002

(54) METHOD AND APPARATUS FOR MANUFACTURING A PLASTIC MATERIAL PARTICULARLY PROVIDED WITH ADDITIVES

(75) Inventors: Klaus Gleich, Minden; Engelbert Heinz, Vlotho, both of (DE)

(73) Assignee: C. A. Lawton Company, DePere, WI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,674

(22) Filed: Sep. 15, 1997

(30) Foreign Application Priority Data

Sep. 16, 1996 (DE) .......................................... 196 37 762
Sep. 19, 1996 (DE) .......................................... 196 38 243

(51) Int. Cl.[7] .................................................. B29B 7/00
(52) U.S. Cl. .......................................... 366/86; 366/88
(58) Field of Search .......................... 366/83, 76.1, 84, 366/76.3, 89, 76.4, 76.6; 425/205, 204, 200, 206, 207, 208, 209, 130

(56) References Cited

U.S. PATENT DOCUMENTS

| | | | | |
|---|---|---|---|---|
| 4,848,915 A | * | 7/1989 | Fintel | 366/76.2 |
| 5,110,275 A | * | 5/1992 | Scheuring | 425/113 |
| 5,185,117 A | | 2/1993 | Hawley | |
| 5,358,680 A | * | 10/1994 | Boissonat et al. | 264/177.2 |
| 5,569,429 A | * | 10/1996 | Luker | 264/211.21 |
| 5,651,944 A | * | 7/1997 | Schultz et al. | 422/137 |

FOREIGN PATENT DOCUMENTS

| | | | |
|---|---|---|---|
| GB | 1151964 | * | 5/1969 |
| JP | 54-075779 | * | 1/1981 |

* cited by examiner

Primary Examiner—Charles E. Cooley
Assistant Examiner—Richard W. Ward
(74) Attorney, Agent, or Firm—George E. Haas; Quarles & Brady LLP

(57) ABSTRACT

The manufacture of a plastic material, particularly provided with fibers, is frequently carried out in an extruder (10). Various problems have arisen in this connection. For example, problems arise in working long or endless reinforcement fibers, for example rovings (27), into the plastic. On the one hand, the fibers are so badly broken up that they have only very small lengths. On the other hand, it has proved difficult to impregnate the fibers sufficiently. According to the invention, in order to feed in fibers, the plastic is moved in batches past a pre-plastifying worm (11). This is achieved by a secondary worm (18) located next to the pre-plastifying worm (11). The secondary worm (18) enables the plastic to be provided in a controlled manner with fibers outside the pre-plastifying worm (11), and enables the secondary worm (18) to be designed in such a way that it satisfies the conditions for a good combination and mixture of the plastic with the additives, and particularly a good impregnation of the fibers.

14 Claims, 3 Drawing Sheets

METHOD AND APPARATUS FOR MANUFACTURING A PLASTIC MATERIAL PARTICULARLY PROVIDED WITH ADDITIVES

BACKGROUND OF THE INVENTION

The invention relates to a method of manufacturing a plastics material, particularly provided with additives, and to an extruder for carrying out the method.

Plastics, such as for example thermoplastics, duroplastics and elastomers, are frequently provided with additives in order to improve their properties. In particular, plastics are reinforced by fibres such as glass fibres, carbon fibres, aramide fibres, natural fibres and plastic fibres. Such fibres are added either as endless fibres, chopped fibres or matting portions to the plastics.

Various methods are known for manufacturing plastics with additives. The invention relates to one of these known possibilities, by means of which the plastic is provided with additives during melting in the extruders. The extruders serving to carry out known methods of this type have various drawbacks. On the one hand there is a lack of homogeneity and impregnation of the plastics or additives. On the other hand added fibres are broken, so that insufficient reinforcement of the plastic is achieved.

SUMMARY OF THE INVENTION

The object underlying the invention is to provide a method of manufacturing a reinforced plastic and a corresponding extruder, so that on the one hand homogeneous plastics with additives may be manufactured and on the other hand no appreciable breakage occurs of the fibres serving for reinforcement.

According to this method, the plastic is moved in batches past the pre-plastifying worm in order to disperse and/or feed in additives. This provides the opportunity of treating the plastic and/or the additives in a controlled and intensive manner outside or next to the pre-plastifying worm and to bring them into combination with one another (to impregnate them). According to a further development of the method according to the invention, in order to move the plastic past the pre-plastifying worm, a secondary worm is used. The preferably separate secondary worm has the advantage that it can be designed differently from the pre-plastifying worm and thus can be better adapted to requirements than said pre-plastifying worm.

In a preferred method, fibres serving for reinforcement, in particular endless fibre skeins, are fed to the plastic in the area of the secondary worm. Here the secondary worm affords the possibility of introducing endless fibres into the molten plastic mass and to work them into the mass in such a way that on the one hand they have a maximum possible length and on the other hand are intensively impregnated.

It has proved particularly advantageous to associate with the secondary worm a pressure-free zone, in which fibres, particularly endless fibres, are introduced into the molten plastic mass. Above all, in this way endless fibres can pass around the secondary worm and thus be introduced into the molten plastic mass. The pressure-free zone preferably extends as far as the pre-plastifying worm, ensuring gentle transfer of the endless skeins from the secondary worm to the pre-plastifying worm. In this connection, and also in the following, the term "pressure-free zone" is taken to mean a zone in which there exists only sufficient pressure to transport the plastic onwards. In this zone there is however no negative pressure, permanent pressure and/or back pressure. In another method, by virtue of the fact that, in the area of the pre-plastifying worm, additives such as for example, fibres or rovings are fed to the plastic continuously, and in particular in endless form, there results an effective combination of the reinforcements with the plastic. In particular however the additives are prevented from being broken up to the extent that only small particles remain in the plastic.

According to a further development of the method, the additives are fed to the at least partly melted plastic in the area of a pressure-free zone of the pre-plastifying worm, In this way it is on the one hand possible to provide the pre-plastifying worm with an opening, open to the exterior, for endless feed of the fibres or rovings. On the other hand, particularly good and effective impregnation of the fibres or rovings is achieved over their entire length.

In further development of all methods, the fibres or rovings fed in in endless form are chopped, during feeding to the pre-plastifying worm, into rovings or fibres of finite length. In the simplest case, this may be effected at the inner edge of the feed located in the housing for the endless fibres or rovings to the worm. For this purpose the rovings are always chopped at this inner edge of the feed opening in the housing when a worm spiral of the worm passes along under the feed opening. The endless fibres or rovings are in this way chopped in a controlled manner. The length of the fibres or rovings results from the worm geometry, in particular the pitch of the worm spirals of the pre-plastifying worm or secondary worm.

By means of the secondary worm, in conjunction with means for transferring the plastic from the pre-plastifying worm to the secondary worm and back (with additives) a type of secondary area is provided for the plastics which enables the plastic to be treated in a controlled manner, to provide it with additives under the conditions required, and to work the additives into the plastic in the necessary way, particularly impregnating, dispersing and/or mixing.

The secondary worm, extending preferably parallel to the pre-plastifying worm, has its own secondary worm housing, which is connected at points with the plasticising housing. Thus each worm has its own housing, which separates the secondary worm from the pre-plastifying worm. Both worms in this way represent independent constructive units, which may be separately repaired as required.

The means for transferring the plastic, or plastic provided with additives, from the pre-plastifying worm to the secondary worm or vice versa, in a preferred further development of the device, are in the form of transitional openings. The transitional openings are more appropriately disposed in the housing wall of the plasticising housing and of the secondary worm housing, in such a way that, by means of apertures aligned towards one another in the walls of both housings, the plastic (if necessary with the additive) can pass to the secondary worm and then from this point back to the pre-plastifying worm.

In one design of the extruder, the secondary worm housing can have an opening for supply of fibres, particularly endless fibres, to the secondary worm. This ensures controlled feed of the fibres, particularly endless fibres, to the extruder and, at a point where a corresponding design of the secondary worm, fulfils the conditions for non-destructive feed of the fibres to the plastic and intensive impregnation.

Alternatively, it may be envisaged that the secondary worm may be provided with a dispersing worm. This serves to disperse plastic mixtures; the secondary worm reinforcing this procedure as dispersal is carried out more effectively in the area of the secondary worm than in the area of the pre-plastifying worm.

Preferred embodiments given by way of example of extruders and methods for manufacturing plastics according to the invention, will be explained in more detail with reference to the drawing, which shows:

DESCRIPTION OF PREFERRED EMBODIMENTS

Figure 1:
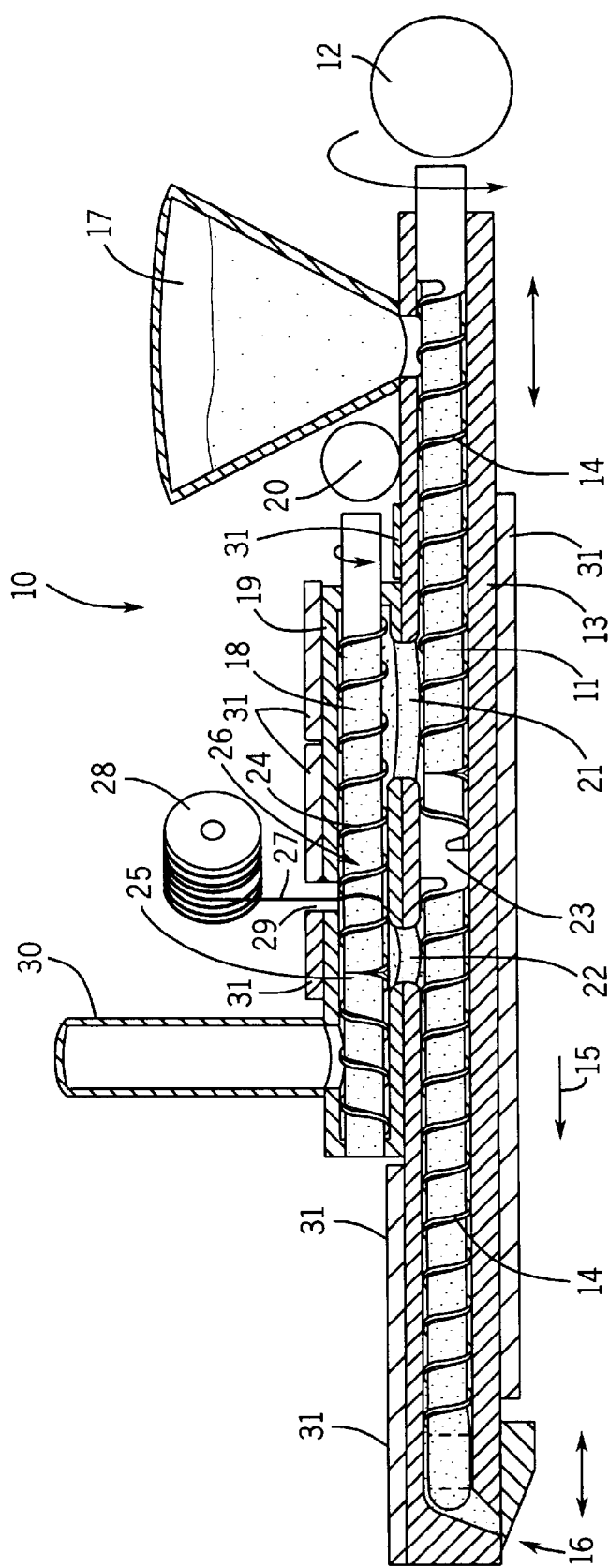
FIG. 1: a schematic longitudinal section of a first embodiment of an extruder.
Figure 2:
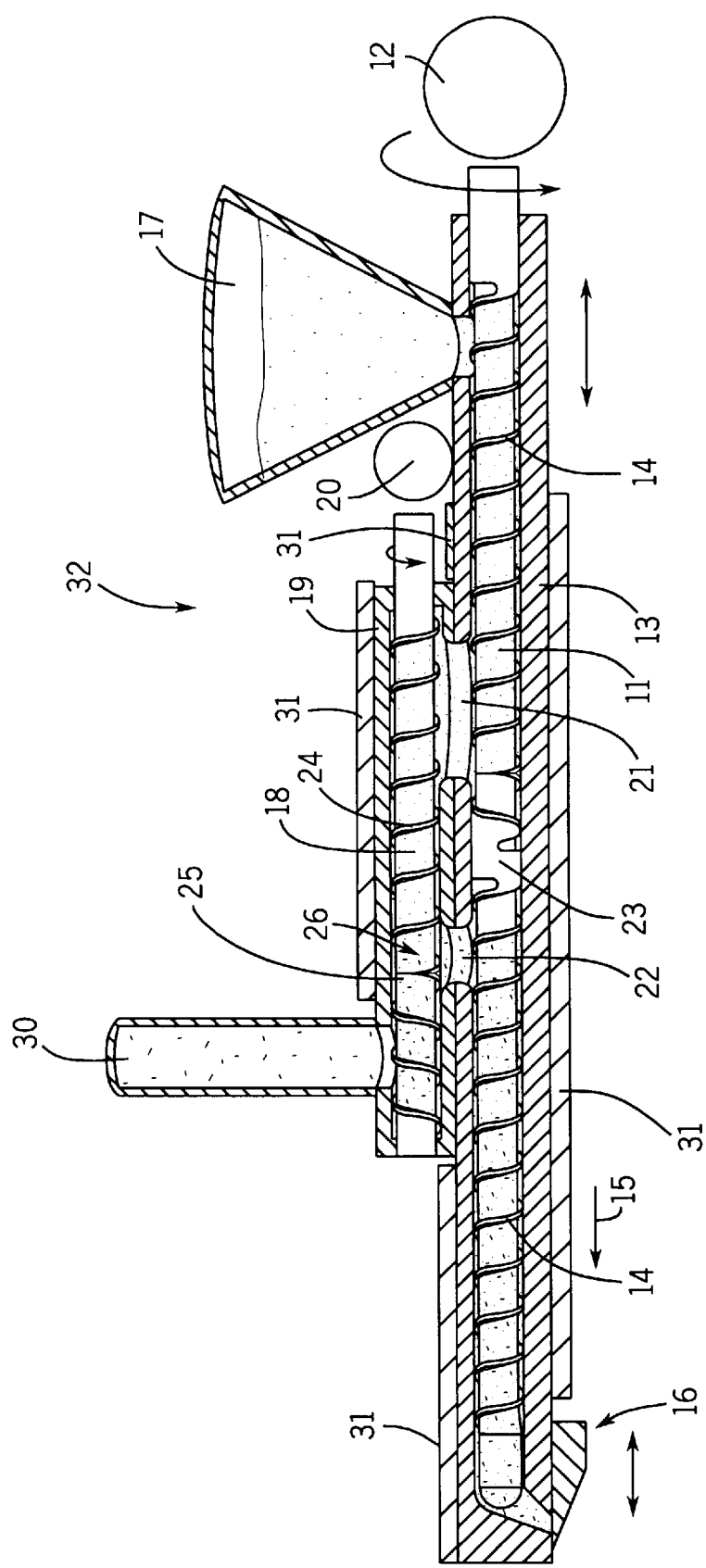
FIG. 2: a second embodiment of an extruder in a longitudinal section similar to FIG. 1, and FIG. 3: a third embodiment of an extruder in a longitudinal section similar to FIGS. 1 and 2.
Figure 3:
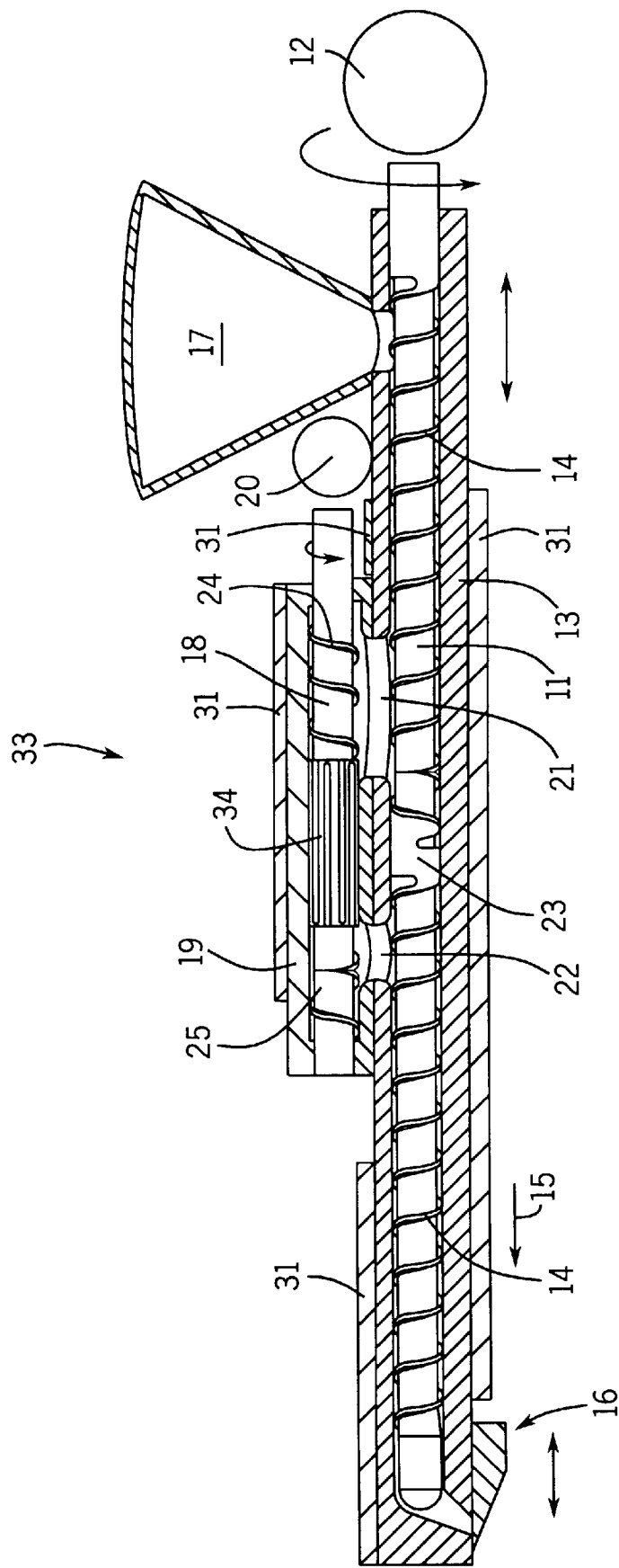

FIGS. 1 to 3 show schematically a portion of an extruder. The extruders shown serve for melting plastics of various types, particularly thermoplastics, duroplastics and elastomers. The extruder simultaneously serves to provide plastics with one or more additives or to treat plastics in any manner during melting, particularly to disperse them. The plastics, which are molten and provided or treated with additives, are expelled under pressure from the extruder from a closable mouthpiece.

FIG. 1 shows schematically a portion of an extruder which serves to melt plastic and to provide it with additives in the form of fibres serving to reinforce the plastic. Involved here are both endless fibres and also chopped fibres or also portions of matting or textile and wood flour or the like.

The extruder 10 has a pre-plastifying worm 11, which is mounted to be driven by a motor 12 shown schematically in a plasticising housing 13. The pre-plastifying worm 11 is provided on its external circumference with a worm spiral 14, the pitch of which is so designed that, in conjunction with a corresponding rotary driving direction of the motor 12, the plastic, including fibres added later, can be transported in the extrusion direction 15 (i.e. in FIG. 1 from right to left) to the closable mouthpiece 16. The still un-melted plastic is fed for example in the form of granulate to the input of the pre-plastifying worm 11, i.e. the end of the pre-plastifying worm 11 opposite the closable mouthpiece 16, and in the embodiment shown through a hopper 17.

According to the invention, a secondary worm 18 is associated with the pre-plastifying worm 11. The secondary worm 18 is disposed in a separate secondary worm housing 19. The secondary worm housing 19 and the plasticising housing 13 are connected together in such a way that they lie against one another with their walls oriented towards one another. In this way the longitudinal medial axis of the pre-plastifying worm 11 and of the secondary worm 18 extend parallel to one another at a spacing apart. The secondary worm 18 is shorter in length than the pre-plastifying worm 11, i.e. is about half its length. The shorter secondary worm 18 is disposed in the central area of the longer pre-plastifying worm 11. The secondary worm in the embodiment shown has its own separate drive, i.e. a motor 20 likewise shown only schematically.

The secondary worm 18 is connected to the pre-plastifying worm 11 by means for introducing the plastic from the pre-plastifying worm 11 to the secondary worm 18 and for removing the plastic reinforcement fibres from the secondary worm 18 to the pre-plastifying worm 11. In the embodiment shown, these means are two transitional openings 21 and 22 following one another at a spacing apart in the extruding direction 15. The transitional openings 21 and 22 are formed by corresponding apertures in the adjacent walls of the plasticising housing 13 on the one hand and of the secondary worm housing 19 on the other hand.

According to the invention, the pre-plastifying worm 11 is provided with a blocking zone 23 located between the two transitional openings 21 and 22. The blocking zone 23 is formed by a particular geometry of the worm spiral 14 of the pre-plastifying worm. In the embodiment shown the blocking zone 23 is formed by a contrary-running pitch of the worm spiral 14. The blocking zone 23 achieves a situation in which the plasticised plastic is passed from the pre-plastifying worm 11 via the first transitional opening 21 in the extrusion device 15 to the secondary worm 18, because in the area of the blocking zone 23, the pre-plastifying worm 11 permits no passage of the molten plastic along the pre-plastifying 11 in the extrusion direction 15.

In the pre-plastifying worm 11, the worm geometry in front of the first transitional opening 21 is preferably identical with the worm geometry behind the second transitional opening 22. Accordingly the worm spirals 14 of the pre-plastifying worm 11 before and after the transitional opening 21 have roughly the same pitches. It may also be envisaged that the pre-plastifying worm 11 may be provided with a worm geometry behind the transitional opening 22 different from the worm geometry in front of the transitional opening 21.

The secondary worm 18 has counter-running worm spirals. A first area of the secondary worm 18, in the extrusion direction 15, has a worm spiral 24 which extends in the extrusion direction 15. A subsequent second worm spiral 25, aligned towards the closable mouthpiece 16, has a contrary configuration, i.e. is designed to convey contrary to the extrusion direction 15. The worm spirals 24 and 25 with contrary pitch meet one another roughly in the area of the transitional opening 22 lying foremost in the extrusion direction 15, i.e. facing the closable mouthpiece 16. In the embodiment shown, the worm spirals 24 and 25 of the secondary worm 18 meet one another at the rear end of the transitional opening 22. The worm geometry of the first worm spiral 24 in the extrusion direction 15 is so designed that, before the meeting of the worm spirals 24 with the oppositely-directed worm spirals 25, a pressure-free zone 26 results. This pressure-free zone 26 begins behind the first transitional opening 21 in the extrusion direction 15 and terminates before the point of meeting of the differently-aligned worm spirals 24 and 25. In addition, the pressure-free zone 26 may also extend over the area of the second transitional opening 22 in the extrusion direction 15. If necessary, the pressure-free zone 26 may even extend over a short section of the following section of the pre-plastifying worm 11 following in the extrusion direction after the blocking zone 23.

According to the invention, the secondary worm housing 19 has an outwardly-facing feed opening 29, which opens into the pressure-free area 26 and serves to feed endless fibres, for example a roving 27, in an uninterrupted manner to the melted plastic. The roving 27 is continuously withdrawn from a roving roll 28 and passed through the feed opening 29 in the secondary worm housing 19 of the secondary worm 18 between two successive spirals. Thus the endless roving 27 is worked into the molten plastic and impregnated.

In addition, the extruder in FIG. 1 has a storage container 30 for supplying chopped fibres or other additives such for example chopped matting or textile portions or wood flour. This storage container 30 is in turn associated with the secondary worm 18, in such a way that the material passes from the container 30 through the secondary worm housing 19 to the worm spiral 25 conveying contrary to the extrusion direction 15. In this way the chopped fibres or other additives are transported from the container 30 to the material in the worm spiral 24 of the secondary worm 18 conveying in the extrusion direction 15 and at this point unified and mixed with the plasticised plastic provided with endless fibres. This mixture of materials passes through the second transitional opening 22 to the section of the pre-plastifying worm 11, lying behind the blocking zone 23, in which the material is transported onward to the closable mouthpiece 16.

Plasticising of the plastic and heating of the plastic inclusive of the fed-in fibres or the like is effected by heating zones 31, shown schematically, on the outside of the plasticising housing 13 and of the secondary worm housing 19.

The method according to the invention with extruder 10 is carried out as follows:

The plastic, which at this stage can already be a mixture, is passed through the hopper 17 to the pre-plastifying worm 11. This latter passes the plastic in extrusion direction 15 to the blocking zone 23. Thus the plastic is moved past heating zones 31, which means that it is plasticised as it reaches the blocking zone 23.

The plastic is then diverted from the blocking zone 23, passing through the first transitional opening 21 to the secondary worm 18.

The secondary worm 18 transports the plasticised plastic conveyed thereto in the area of the worm spiral 24 in extrusion direction 15. Thus the plasticised plastic reaches the pressure-free area 26. At this point endless fibres, particularly the roving 27, are endlessly unwound from the roving roll 28 and continuously fed through the feed opening 29 in the secondary worm housing 19 to the secondary worm 18. Thus the roving 27 is worked into, and particularly impregnated by, the plasticised plastic.

Further additives, for example chopped fibres, are fed to the end of the secondary worm 18 facing the closable mouthpiece 16 from the supply container 30. The chopped fibres are passed contrary to the extrusion direction 15 through the end area located in the area of the supply container 30 of the secondary worm 18 by means of a counter-running worm spiral 15, to the plasticised plastic provided with the roving and is there mixed. The resultant mixture passes through the second transitional opening 22 out of the area of the second worm 18 back into the area of the pre-plastifying worm 11, i.e. behind the blocking zone 23, and thus to the second section of the pre-plastifying worm 11, facing the closable mouthpiece 16. This second section of the pre-plastifying worm 11 then transports the molten plastic provided with impregnated fibres and if necessary other additives to the closable mouthpiece 16 of the extruder 10, where, if necessary under pressure, the plasticised and reinforced plastic is ejected.

FIG. 2 shows an extruder 32, which is substantially identical with the extruder 10. Therefore the same reference numbers are used for identical parts.

The extruder 32 differs from the extruder 10 in that, in the area of the secondary worm 38, only ore storage container 30 serves to supply chopped fibres, wood flour, textile portions or other additives. By means of the extruder 32, the corresponding short-fibre additive may be fed in the area of the secondary worm 18 to molten plastic of a molten plastic mixture, the molten plastic being combined with the additive by counter-conveying worm spirals 24 and 25 in the region of the transitional opening 22 to the pre-plastifying worm 12 and being mixed or impregnated. For this purpose the end of the worm spiral 24 facing the worm spiral 25 can also have a pressure-free area 26. However, due to the lack of the feed opening 29 (FIG. 1) for an endless roving 27, in the extruder 32 the pressure-free area 26 can be omitted.

FIG. 3 shows an extruder 33 which can also be suitable for plasticising un-reinforced plastics. The extruder 33 corresponds in its basic structure with the extruder 10. For this reason here also the same reference numbers are used for identical parts.

Contrary to extruder 10 in FIG. 1, the extruder 33 has in the area of the secondary worm 18 a feed facility for any additives to the plastic. The secondary worm 18 rather serves to disperse the plastic or a plastic mixture. For this purpose the secondary worm 18 has a dispersing zone 34. The dispersing zone 34 extends substantially between the transitional openings 21 and 22. In the embodiment shown, the dispersing zone 34 projects slightly into the area of the first transitional opening 21. The dispersing zone 34 is designed as is already known with pre-plastifying 25 worms 11.

In contrast to the embodiments shown above, it is possible to design the secondary worm and also the pre-plastifying worm as a double worm, which may run in the same direction, or counter to one another. In addition it is feasible to propel the secondary worm at a rotational speed different from that of the pre-plastifying worm. Further it is feasible to design the pre-plastifying worm and/or the secondary worm, in contrast to the illustrations in FIG. 3, as axially movable. Finally, it can be advantageous to provide the secondary worm and/or the pre-plastifying worm with means for opening or tearing up matting or textile portions or fibre parts. This improves the capacity for impregnation of these reinforcing materials.

What is claimed is:

1. An apparatus for producing a plastic that contains an additive, said apparatus comprising:
    a housing structure having a first bore, a second bore, an inlet for introducing the plastic into the first bore, and an outlet leading from the first bore, a first feed opening is provided in the housing structure for introducing a first additive into the second bore, the housing structure further having a first opening and a second opening providing separate passages between the first bore and the second bore;
    a pre-plastifying worm within the first bore and having a first worm section which transfers plastic between the inlet and the first opening and forces the plastic through the first opening, and the pre-plastifying worm having a second worm section which carries the plastic through the first bore from the second opening to the outlet; and
    a secondary worm within the second bore of the housing structure for combining the first additive with the plastic to form a mixture that is forced from the second bore through the second opening.

2. The apparatus as recited in claim 1 further comprising an element forming a blocking zone in the first bore between the first opening and the second opening, wherein the pre-plastifying worm passes through the blocking zone, and the element restricts flow of the plastic through the blocking zone.

3. The apparatus as recited in claim 2 wherein the element forming the blocking zone comprising a third worm section on the pre-plastifying worm, wherein the third worm section has a pitch that is contrary to pitches of the first worm section and the second worm section.

4. The apparatus as recited in claim 1 wherein secondary worm forms a pressure-free zone into which the first additive is introduced from the first feed opening.

5. The apparatus as recited in claim 1 wherein secondary worm forms a pressure-free zone in the second bore between the first feed opening and the second opening.

6. The apparatus as recited in claim 1 wherein the housing structure has a second feed opening for introducing a second additive into the second bore wherein the second feed opening is located on a remote side of the second opening from the first feed opening.

7. The apparatus as recited in claim 6 wherein the secondary worm has a first worm spiral for moving the first additive from the first feed opening to the second opening, and a second worm spiral for moving the second additive from the second feed opening to the second opening, and the first worm spiral and the second worm spiral have contrary pitches.

8. The apparatus as recited in claim 1 wherein the secondary worm forms a dispersing zone between the first opening and the second opening for dispersing the first additive throughout the plastic.

9. The apparatus as recited in claim 1 wherein the first bore is substantially parallel to the second bore.

10. The apparatus as recited in claim 1 further comprising a first motor for driving the pre-plastifying worm; and a second motor for driving the secondary worm.

11. An apparatus for producing a plastic that contains an additive, said apparatus comprising:

a plasticising housing having a first elongated bore and an inlet for introducing the plastic into the first elongated bore, and having an outlet;

a secondary worm housing having a second elongated bore with a feed opening for introducing an additive into the second elongated bore, and having a first opening and a second opening both providing separate passages between the first elongated bore and the second elongated bore;

a first feeder for supplying the plastic to the inlet of the plasticising housing;

a second feeder for supplying the additive to the feed opening of the secondary worm housing;

an element forming a blocking zone along the first elongated bore between the first opening and the second opening, wherein the element restricts flow of the plastic through the blocking zone;

a pre-plastifying worm within the first elongated bore of the plasticising housing and passing through the blocking zone, and having a first worm section on one side of the blocking zone and a second worm section on another side of the blocking zone, wherein plastic in the first worm section is forced though the first opening by the pre-plastifying worm and wherein the second worm section carries the plastic from the second opening to the outlet of the plasticising housing; and a secondary worm within the second elongated bore of the secondary worm housing for mixing the additive with the plastic.

12. The apparatus as recited in claim 11 wherein the element forming the blocking zone comprising a third worm section on the pre-plastifying worm, wherein the third worm section has a pitch that is contrary to pitches of the first worm section and the second worm section.

13. The apparatus as recited in claim 11 wherein secondary worm forms a pressure-free zone into which the additive is introduced from the feed opening.

14. The apparatus as recited in claim 11 wherein the first bore is substantially parallel to the second bore.

\* \* \* \* \*